United States Patent

[11] 3,614,075

[72] Inventor Vernon J. Hurst
Athens, Ga.
[21] Appl. No. 843,656
[22] Filed July 22, 1969
[45] Patented Oct. 19, 1971
[73] Assignee J. M. Huber Corporation
Locust, N.J.

[54] VISCOSITY REDUCTION OF KAOLIN BY HYDROTHERMAL TREATMENT
7 Claims, 1 Drawing Fig.

[52] U.S. Cl. .................................................. 263/52
[51] Int. Cl. .................................................. F27b 9/00
[50] Field of Search .................................... 263/36, 37, 38, 39, 52, 53, 290.5

[56] References Cited
UNITED STATES PATENTS

| | | | |
|---|---|---|---|
| 2,411,847 | 12/1946 | Bokeeno ..................... | 263/52 |
| 2,688,606 | 9/1954 | Schmitt et al. ............... | 23/290.5 X |
| 3,301,691 | /1967 | Hemstock et al. ............ | 106/72 |

Primary Examiner—John J. Camby
Attorney—Harold H. Flanders

ABSTRACT: A hydrothermal treatment for processing kaolin clay slurries containing from 5–60 percent solids in which the plastic crudes are treated between 200° C.–460° C. at pressures up to 30,000 pounds pressure per square inch for from 1–60 minutes reduces the viscosity of the kaolin slurry at least 20 percent and often as much as 50 to 90 percent, producing viscosities on the order of 100 c.p.s. at 20 r.p.m. Brookfield or lower. A particularly advantageous embodiment of the present invention is the continuous hydrothermal treatment of kaolin slurries.

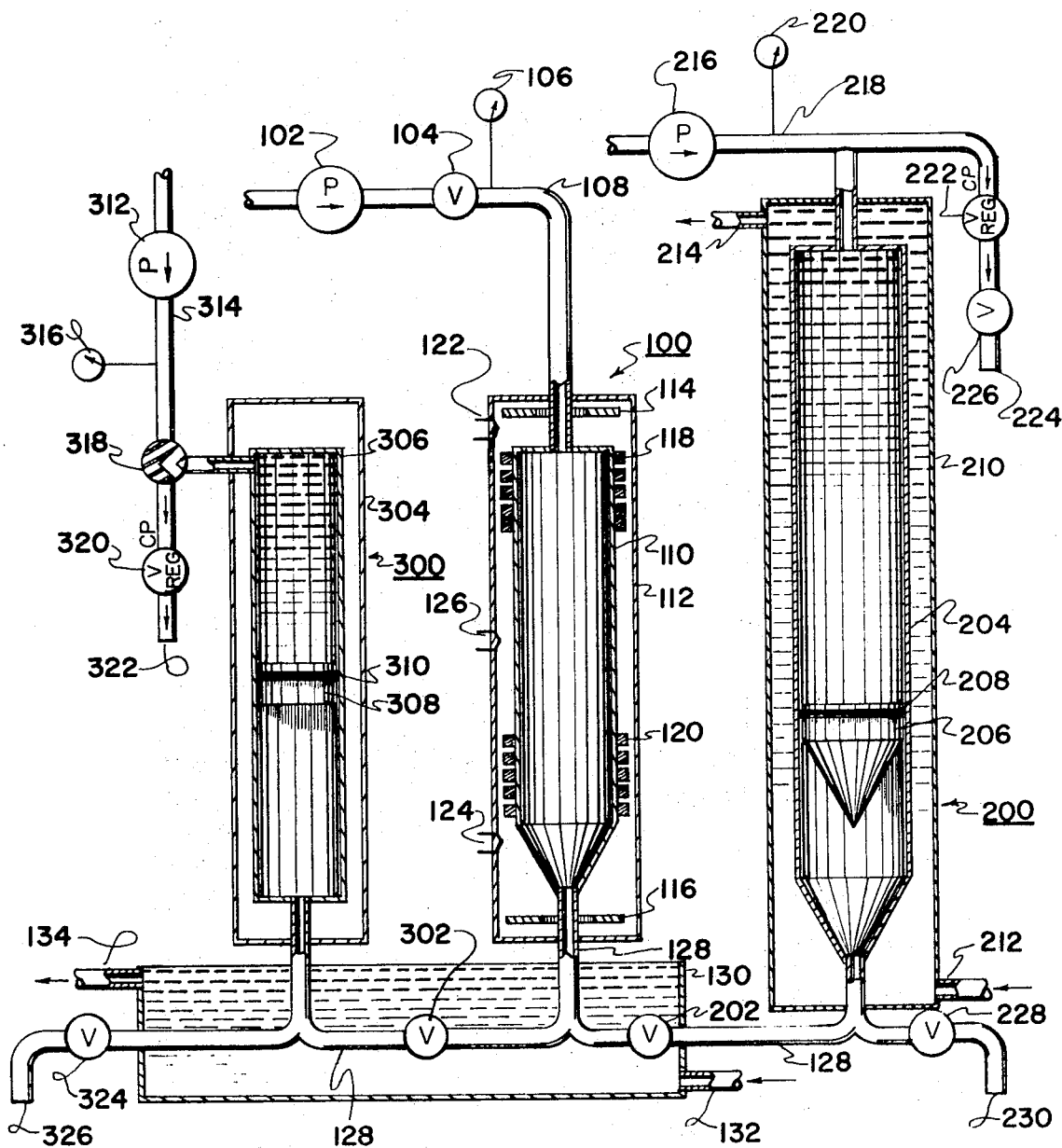

3,614,075

VISCOSITY REDUCTION OF KAOLIN BY HYDROTHERMAL TREATMENT

CROSS-REFERENCE TO RELATED APPLICATIONS

A copending application, Ser. No. 843,535, filed July 22, 1969, entitled "Continuous Hydrothermal Apparatus and Process," filed of even date with the present application by the present invention describes in detail one form of specific apparatus for carrying out the process of the present invention.

BACKGROUND OF THE INVENTION

1. Field of the Invention

The present inventor relates, in general, to hydrothermal reactions and, more particularly, to a particularly advantageous continuous hydrothermal treatment for the reduction of viscosity in kaolin clays.

2. Description of the Prior Art

Kaolin clay in sold under rigid specifications on properties such as viscosity. Natural variations in the properties of kaolin clays are common as a result of variations in mineral composition, particle size, particle shape, and particle size distribution. Within limits it is possible to alter the properties of kaolin clays by processing techniques such as shear, fractionation, blending, and the use of chemical reagents. Hydrothermal treatment of kaolin clays to alter their properties has received only limited attention as a means of extending the range of useful kaolin materials because the prior art has been limited to batch treatments, characterized by poor control and has produced only limited viscosity reductions. Further, the prior art methods of batch treating have required long times in the heating cycle and, at least, equally long times in the cooling cycle, so that short reaction times for processing were not feasible.

SUMMARY OF THE INVENTION

Accordingly, it is an object of the present invention to provide a new, highly effective hydrothermal process for the reduction of kaolin clay viscosity which overcomes the deficiencies of the prior art as described above.

It is a further object of the present invention to provide a hydrothermal process in which the temperature and pressure may be carefully stabilized and controlled.

Another object of the present invention is to provide a process utilizing hydrothermal treatment and processing of slurries without deformation of the kaolin crystals by mechanical forces.

A further object of the present invention is to provide a hydrothermal treatment process in which the kaolin clay slurry is subjected to high temperatures and high pressures for short periods of time on large volumes.

An additional object of the present invention is to provide a hydrothermal treatment process in which a kaolin clay slurry is introduced to, maintain in, and withdrawn from a reaction zone under controlled equilibrium conditions and high pressure with low shear.

Other objects and a fuller understanding of the present invention may be had by referring to the following description and claims taken in conjunction with the accompanying drawings.

The present invention in a particularly advantageous embodiment overcomes the deficiencies of the prior art and achieves its objectives by providing for the continuous passage through a central reaction zone for a kaolin clay slurry followed by the introduction of the reacted slurry into one of a plurality of back pressured condenser-exchanges prior to discharge at atmospheric pressure.

BRIEF DESCRIPTION OF THE DRAWING

In order to facilitate the understanding of the present invention, reference will now be made to the appended drawing of one form of apparatus suitable for carrying out the process of the present invention. The drawing should not be construed as limiting the invention but is exemplary only. In the drawing:

The FIGURE is a partial cross-sectional schematic representation of one form of hydrothermal reaction apparatus suitable for carrying out the process of the present invention.

DESCRIPTION OF THE PREFERRED EMBODIMENT

A hydrothermal reaction apparatus suitable for carrying out the precess of the present invention is shown in the accompanying FIGURE in which 100 generally indicates the central hydrothermal reactor. One of a plurality of condenser-exchangers is indicated at 200 while another condenser-exchanger is indicated at 300.

A high-pressure pump 102 serves to feed a slurry through valve 104, past pressure gauge 106 via tubing 108 into a hydrothermal reaction vessel 110 having a volume of approximately 175 cubic centimeters inside of insulated jacket 112 of the hydrothermal reactor 100.

The hydrothermal reaction vessel 110 may be heated by circular end heaters 114 and 116 having a power of 1,000 watts each and by five strip heaters 118 having a power of 500 watts each at the top and by five additional strip heaters 120 having a power of 500 watts each at the bottom.

The temperature of the hydrothermal reaction vessel 110 may be measured by thermocouples 122, 124 and 126 placed as shown in the accompanying FIGURE The temperature of the hydrothermal reaction vessel 110 may be adjusted in response to the readings of the thermocouples 122, 124, and 126 by adjusting the power applied to each of the heating elements making up 114, 116, 118, and 120.

Tubing 128 serves to transport slurry to either condenser-exchanger 200 through valve 202 or to condenser-exchanger 300 through valve 302.

Tank 130 is provided with circulating water for cooling tubing 128 and valves 202 and 302 by means of inlet 132 and outlet 134.

Condenser-exhanger 200 comprises an inner condenser-exchanger vessel 204 having a volume of approximately 4,360 cubic centimeters. Within the inner condenser-exchanger vessel 204 is a movable plunger 206 which is sealed to the walls of the inner condenser-exchanger vessel 204 by rings 208 having the same coefficient of thermal expansion as the walls of the inner condenser-exchanger vessel 204.

Inner condenser-exchanger is water cooled by a flow of water between the walls of water jacket 210 and the outer walls of inner condenser-exchanger vessel 204. The flow of water within the water jacket 210 is maintained by a flow through inlet 212 and out of outlet 214.

A high-pressure water pump 216 may be employed to force water through tubing 218 past pressure gauge 220 to produce pressure against the top surface of plunger 206.

A constant inlet pressure needle valve 222 on tubing 218 may be utilized to bleedoff water in the upper portion of condenser-exchanger vessel 204. The flow of the water discharge through water discharge outlet 224 on tubing 218 may be further controlled by valve 226.

The discharge of reacted slurry may be controlled by valve 228 prior to slurry discharge outlet 230.

Tubing 128 also allows for the passage of slurry through valve 302 to condenser-exchanger 300 which also may have a water jacket 304 on the outside of an inner condenser-exchanger vessel 306 having a volume of approximately 245 cubic centimeters.

Within the inner condenser-exchanger vessel 306 is a movable plunger 308 which is sealed to the walls of the inner condenser-exchanger vessel 306 by sealing rings 310 having a like coefficient of linear expansion to that of the walls of inner condenser-exchanger vessel 306.

A high pressure water pump 312 may be utilized to force water through tubing 314 passed pressure gauge 316 and through valve 318 into the top of inner condenser-exchanger vessel 306 applying pressure to the top of plunger 308.

Water may be bled off through valve 318 and through constant inlet pressure needle valve 320 to water discharge outlet 322.

Reacted slurry may be discharged through valve 324 through the slurry discharge outlet 326.

While specific pumps, tubing, valving thermocouples, gauges, and vessel volumes have been referred to throughout in this description of one form of apparatus suitable for carrying out the present invention it is obvious to one of ordinary skill in the art that many other obvious equivalent means and configurations may be employed.

The reactor vessels and fixtures are preferably constructed of titanium-aluminum alloys noted for their strength and stability and resistance to corrosion under the operating conditions of high temperature and pressure. The condenser-exchanger vessels may be made of stainless steel. It is obvious that any suitable material exhibiting the above-described strength, stability and corrosion resistance under the operating conditions of temperature may be employed. Typical materials illustrating high strength and corrosion resistance under high temperature and pressure operating conditions are various combinations of titanium, aluminum, titanium-aluminum alloys, titanium-aluminum-vanadium alloys, waspaloy, and 404 stainless steel.

The control of heat input and of operating pressures may be automatically controlled to the extent desired and warranted by the economics of commercial operations.

In operation, the central hydrothermal reaction vessel 110 is heated by means of end heaters 114 and 116 and strip heaters 118 and 120 while the chamber of the reaction vessel 110 is filled with water from high-pressure pump 102 passing though tubing 108 and valve 104. The reactor vessel 110 is brought to operating conditions of temperature and pressure before any further processing on a slurry is begun.

A slurry of clay or other desired material is then pumped into the reaction vessel 110 by the high pressure pump 102, through valve 104. The pressure is monitored by pressure gauge 106 and maintained at a steady value both during the introduction of the slurry and throughout the subsequent processing. The high-pressure pump 102 is built so that it maintains a steady preset pressure at all times. The slurry is introduced at the top of the reactor vessel 110 while simultaneously withdrawing the water or whatever other material was in the reactor vessel 110 through valve 202. Note that at this time the valves 104 and 202 are open. The pressure is maintained on the slurry in front of valve 104 by high-pressure pump 102.

During this process water which filled condenser-exchanger vessel 204 above plunger 206 is bled off through the needle valve 222 and valve 226. The reaction time is regulated by the rate of bleedoff of the water through needle valve 222. The rate of flow is maintained so that the hot vapors from the reactor vessel 110 are condensed in the tubing 128 surrounded by cold water in the water tank 130. The rate of flow is adjusted so that the transmit time from the top of reaction vessel to the bottom of reaction vessel is equal to the desired reaction time. For example, a bleedoff rate of 12.3 cubic centimeters per minute will cause the slurry to pass through the reaction vessel 110 with a volume of about 173 cubic centimeters in approximately 14 minutes.

After the reaction vessel 110 has been completely filled with the slurry, by withdrawing the water in a controlled fashion through valve 202, the rate of flow of the slurry through the reactor is thereafter maintained by releasing the water in a controlled fashion from above the plunger 206 in the condenser-exchanger vessel 204 through needle valve 222. At the start the plunger 206 is close to or at the bottom of the condenser-exchanger 204. As the slurry material passes through the reaction vessel 110 and into the condenser-exchanger vessel 204 the plunger 206 moves toward the top of the condenser-exchanger 204.

After condenser-exchanger 204 has been filled to a large extent with slurry, the valve 202 is closed and the valve 302 simultaneously opened. At this point the plunger 308 in condenser-exchanger vessel 306 is at the bottom of the vessel 306. As water is bled off through the needle valve 320, the reacted slurry now enters condenser-exchanger vessel 306.

While condenser-exchanger vessel 306 is being filled, condenser-exchanger vessel 204 can be emptied through valve 228 by pumping water in through the high pressure pump 216 and thereby driving the plunger 206 back to the bottom of the condenser-exchanger vessel 204. As soon as condenser-exchanger vessel 204 has been emptied valve 302 may close at the same time valve 202 is opened. While condenser-exchanger vessel 204 is being filled, condenser-exchanger vessel 306 can be discharged through valve 324 by pumping in water from high pressure pump 312 through valve 318 to drive the plunger 308 in the condenser-exchanger vessel 306 back down to the bottom of vessel 306.

The above cycling may be repeated as many times as desired and in this manner produce a continuous passage of the slurry through the reactor vessel 110.

The rate of heating around the reactor vessel 110 by elements 114, 116, 118, and 120 can be adjusted to maintain the continuously flowing and reacting slurry at a desired uniform temperature.

The above-described apparatus permits a continuous flow of slurry to be subjected to high temperatures and pressures for any period of time ranging from a couple of minutes to hours.

The above-described apparatus has no sharp bends or corners through which the slurry must pass thereby eliminating a major source of blockages and providing for trouble-free continuous operations.

The process of the present invention enables one to introduce suspended clay particles or similar slurried materials under high pressure, to be reacted at a constant high temperature, and to withdraw the slurried material from the reactor and return it to atmospheric pressure without the necessity of passing the slurried materials through such a small orifice as might disrupt the slurried particles mechanically and increase shear on the particles.

The process of the present invention is exceptional in that it provides a continuous flow of slurried materials to be subjected to high temperatures and high pressures for controllably short periods of time in large volumes without encountering many of the traditional problems associated with hydrothermal treatments.

While the above description relates to a specific, continuous hydrothermal treatment apparatus suitable for carrying out the present invention, other continuous reactors may be employed in which one may have continuous access to and from the reaction vessel by the reactants and products.

It should also be noted that while a continuous hydrothermal reaction is particularly advantageous, the invention of the present case in no way excludes the obvious use of batch processes and apparatus.

Attention is also directed to the fact that it is particularly advantageous to operate the present invention in the defined range below 430° C.

The following examples and tables represent the data obtained in carrying out the process of the present invention; however, it is not intended to limit the scope of the invention to the specifics recited therein.

The Brookfield viscosities are at 70 percent solids unless otherwise noted using a No. 1 spindle at 20 r.p.m.

The Hercules viscosities are reported in dyne units at r.p.m. indicated. Eighteen units is the maximum torque recorded on the viscometer. Higher r.p.m. at 18 dyne units represents lower viscosity.

Unless otherwise noted the hydrothermal treatment pressure was 4,500–5.000 p.s.i.

The hydrothermally treated slurries were in each case flocculated with alum, filtered, and dried in accord with standard viscosity test procedures. Viscosity measurements were made on a chemically dispersed clay system at 70 percent solids with a Brookfield viscometer (Model LVT) at 20 r.p.m. and a Hercules Hi Shear viscometer (Model 24–4AC).

EXAMPLE 1 (Control)

A Georgia kaolin clay was tested without hydrothermal treatment to serve as a control for the specified following examples. The unleached brightness of this clay was 82.6 and its leached brightness after treatment with 10 pounds of $ZnS_2O_4$ per ton of dry clay was 84.4. This clay had a Brookfield viscosity of 870 c.p.s. and a Hercules viscosity of 18 dynes at 665 r.p.m.

EXAMPLE 2

A 15 percent solids Georgia kaolin slurry of the clay of example 1 was hydrothermally treated at 350° for 4 minutes. The unleached brightness of the treated clay was 82.7 and the leached brightness was 84.9. The Brookfield viscosity of the treated clay was 710 and its Hercules viscosity was 18 dynes at 690 r.p.m.

EXAMPLE 3

A 30 percent solids slurry of the clay of example 1 was hydrothermally treated at 350° C. for 4 minutes to produce a Hercules viscosity of 18 dynes at 700 r.p.m. and a Brookfield viscosity of 580 c.p.s. or a reduction of 34.5 percent in Brookfield viscosity.

EXAMPLE 4

A 15 percent solids slurry of the clay of example 1 was hydrothermally treated at 350° C. for 8 minutes to produce a Hercules viscosity of 18 dynes at 755 r.p.m. and a Brookfield viscosity of 530 c.p.s. or a reduction of 39 percent in Brookfield viscosity.

EXAMPLE 5

A 15 percent Georgia kaolin slurry of the clay of example 1 was hydrothermally treated at 250° C. for 14 minutes. The unleached brightness of the treated clay was 82.7 and its leached brightness was 84.7. The Brookfield viscosity of the treated clay was 750 c.p.s. and its Hercules viscosity was 18 dynes at 775 r.p.m.

EXAMPLE 6

A 25 percent solids slurry of the clay of example 1 was hydrothermally treated for 14 minutes at 250 ° C. The unleached brightness of this clay following hydrothermal treatment was 80.7 and its leached brightness following additional treatment by 10 pounds of $ZnS_2O_4$ per ton of dry clay was 84.4. The Hercules viscosity of the treated clay was 18 dynes at 880 r.p.m. and its Brookfield viscosity was 610 c.p.s. for a reduction in Brookfield viscosity of 30 percent.

EXAMPLE 7

A 15 percent solids Georgia kaolin slurry of the clay of example 1 was hydrothermally treated at 300° C. for 14 minutes. The unleached brightness of the treated clay was 80.3 and its leached brightness was 84.3. The Brookfield viscosity of the treated clay was 630 c.p.s. and its Hercules viscosity was 18 dynes at 780 r.p.m.

EXAMPLE 8

A 25 percent solids slurry of the clay of example 1 was hydrothermally treated for 14 minutes at 300° C. The unleached brightness of this clay following hydrothermal treatment was 78.2 and its leached brightness following additional treatment by 10 pounds of $ZnS_2O_4$ per ton of dry clay was 84.4. The Hercules viscosity of the hydrothermally treated clay was 18 dynes at 955 r.p.m. and the Brookfield viscosity was 262 for a reduction of Brookfield viscosity of 70 percent.

EXAMPLE 9

A 30 percent solids slurry of the clay of example 1 was hydrothermally treated for 14 minutes at 300° C. The unleached brightness of this clay following hydrothermal treatment was 75.5 and its leached brightness following the additional treatment by 10 pounds of $ZnS_2O_4$ per ton of dry clay was 84.85. The Hercules viscosity of the hydrothermally treated clay was 18 dynes at 910 r.p.m. and the Brookfield viscosity of the hydrothermally treated clay was 336 c.p.s. for a reduction in Brookfield viscosity of 61 percent.

EXAMPLE 10

A 15 percent solids Georgia kaolin slurry of the clay of example 1 was hydrothermally treated at 350° C. for 14 minutes. The unleached brightness of the treated clay was 78.2 and its leached brightness was 84.5. The Brookfield viscosity of the treated clay was 412 and its Hercules viscosity was 18 dynes at 840 r.p.m.

EXAMPLE 11

A 25 percent solids slurry of the clay of example 1 was hydrothermally treated for 14 minutes at 350° C. The unleached brightness of this clay following hydrothermal treatment was 74.5 and its leached brightness following additional treatment by 10 pounds of $ZnS_2O_4$ per ton of dry clay was 84.3. The Hercules viscosity of the hydrothermally treated clay was 18 dynes at 1,090 r.p.m. and the Brookfield viscosity was 217 c.p.s. for a reduction of Brookfield viscosity of 75 percent.

EXAMPLE 12

A 30 percent slurry of the clay of example 1 was hydrothermally treated for 14 minutes at 350° C. The unleached brightness of this clay following hydrothermally treatment was 74.75 and its leached brightness following the additional treatment by 10 pounds of $ZnS_2O_4$ per ton of dry clay was 85,05. The Hercules viscosity of the hydrothermally treated clay was 18 dynes at 1.085 r.p.m. and the Brookfield viscosity of the hydrothermally treated clay was 258 c.p.s. for a reduction in Brookfield viscosity of 70 percent.

EXAMPLE 13

A 25 percent solids slurry of the clay of example 1 was hydrothermally treated for 14 minutes at 385° C. The unleached brightness of this clay following hydrothermal treatment was 74.5 and its leached brightness following the additional treatment by 10 pounds of $ZnS_2O_4$ per ton of dry clay was 84.5. The Hercules viscosity of the hydrothermally treated clay was 18 dynes at 1,075 r.p.m. and the Brookfield viscosity was 236 c.p.s. for a reduction in Brookfield viscosity of 73 percent.

EXAMPLE 14

A 30 percent solids slurry of the clay of example 1 was hydrothermally treated for 14 minutes at 385° C. The unleached brightness of this clay following hydrothermal treatment was 75.05 and its leached brightness following the additional treatment by 10 pounds of $ZnS_2O_4$ per ton of dry clay was 84.75. The Hercules viscosity of the hydrothermally treated clay was 17.0 and the Brookfield viscosity was 236 c.p.s. for a reduction in Brookfield viscosity of 73 percent.

EXAMPLE 15

A 25 percent solids slurry of clay of example 1 was hydrothermally treated for 20 minutes at 300° C. and a pressure of 4.500 p.s.i. The clay's unleached brightness after hydrothermal treatment was 74.7 and its leached brightness after treatment with 10 pounds of $ZnS_2O_4$ per ton of dry clay was 84.4. The treated clay had a Hercules viscosity of 18 dynes at 895 r.p.m. and had a Brookfield viscosity of 290 c.p.s. for a reduction of Brookfield viscosity of 67 percent.

EXAMPLE 16

A 30 percent solids slurry of the clay of example 1 was hydrothermally treated for 30 minutes at 300° C. The clays unleached brightness after treatment was 74.1 and its leached brightness was 84.6. The treated clay had a Hercules viscosity of 18 dynes at 1,085 r.p.m. and had a Brookfield viscosity of 296 c.p.s., for a reduction in Brookfield viscosity of 66 percent.

EXAMPLE 17

A 30 percent solids slurry of the clay of example 1 was hydrothermally treated at 350° C. for 30 minutes to produce a Hercules viscosity of 18 dynes at 1,040 r.p.m. and a Brookfield viscosity of 190 c.p.s. or a reduction of 78.5 percent in Brookfield viscosity.

EXAMPLE 18

A 15 percent solids slurry of the clay of example 1 was hydrothermally treated for 14 minutes at 430° C. A 70 percent solids slurry of this material showed a Brookfield viscosity of 500 c.p.s. and the Hercules viscosity of this 70 percent slurry was 18 dynes at 530 r.p.m. It should be noted that this measurement represents a 43 percent reduction in viscosity of the slurry.

EXAMPLE 19 (Control)

A high viscosity crude Georgia kaolin was degritted without dispersant and not further treated prior to testing so as to be a control for the following specified examples. The unleached brightness of this clay was 78.4 and the leached brightness after treatment with 10 pounds of $ZnS_2O_4$ per ton was 83.6. The Brookfield viscosity was 945 c.p.s. and a Hercules viscosity of 18 dynes at 575 r.p.m.

EXAMPLE 20

A 25 percent solids slurry of the clay of example 19 was hydrothermally treated for 8 minutes at 300° C. The unleached brightness of the treated clay was 78.2 and its leached brightness was 83.5. After hydrothermal treatment, the clay had a Hercules viscosity of 18 dynes at 510 r.p.m. and a Brookfield viscosity of 720 c.p.s., a reduction in Brookfield viscosity of 24 percent.

EXAMPLE 21

A 35 percent solids slurry of the clay of example 19 was hydrothermally treated for 8 minutes at 300° C. The unleached brightness of the treated clay was 78.2 and its leached brightness was 83.4. After hydrothermal treatment the clay had a Hercules viscosity of 18 dynes at 555 r.p.m. and a Brookfield viscosity of 612 c.p.s. a reduction in Brookfield viscosity of 35 percent.

EXAMPLE 22

A 12 percent solids slurry of the clay of example 19 was hydrothermally treated for 8 minutes at 385° C. The unleached brightness of the treated clay was 76.7 and its leached brightness was 82.0. After hydrothermal treatment the clay had a Hercules viscosity of 18 dynes at 625 r.p.m. and a Brookfield viscosity of 442 c.p.s. a reduction of 53 percent in Brookfield viscosity.

EXAMPLE 23

A 23 percent solids slurry of the clay of example 19 was hydrothermally treated for 8 minutes at 385° C. The unleached brightness of the treated clay was 74.7 and the leached brightness was 81.0. The Brookfield viscosity was 441 c.p.s. and the Hercules viscosity was 18 dynes at 650 r.p.m. This reduction amounts to a 53 percent reduction in Brookfield viscosity.

EXAMPLE 24

A 35 percent solids slurry of the clay of example 19 was hydrothermally treated for 8 minutes at 385° C. The unleached brightness of the treated clay was 76.7 and the leached brightness was 81.8. The Brookfield viscosity of the treated clay was 590 c.p.s. and the Hercules viscosity was 18 dynes at 535 r.p.m. This hydrothermal treatment resulted in a 38 percent reduction in Brookfield viscosity.

EXAMPLE 25

A 25 percent slurry of the clay of example 19 was hydrothermally treated for 20 minutes at 200° C. at a pressure of 5.000 p.s.i. The clays unleached brightness after treatment was 78.6 and its leached brightness after treatment with 10 pounds of $ZnS_2O_4$ per ton as 83.5 The clays Hercules viscosity after treatment was 18 dynes at 585 r.p.m. and the clays Brookfield viscosity after treatment was 740 c.p.s. for a reduction of Brookfield viscosity of 22 percent.

EXAMPLE 26 (Control)

A degritted crude gray clay was oxidized with NaOCl only. This clay was then filtered and washed, and otherwise untreated to serve as a control for the next example. The minimum Brookfield viscosity of this sample was 714 c.p.s. The clay had an unleached brightness of 80.6 and a leached brightness of 80.9.

EXAMPLE 27

A 15 percent solids slurry of the clay of example 26 was hydrothermally treated for 8 minutes at 385° C. The minimum Brookfield viscosity was measured as 407 c.p.s. for a reduction in Brookfield viscosity. The unleached brightness of this clay was 80.3 and the leached brightness was 78.9. No significant brightness loss occurred as a result of the hydrothermal treatment.

EXAMPLE 28 (Control)

A plastic crude clay was degritted without dispersant and left otherwise untreated as a control for the next example. The brightness of the unleached portion of this clay was 80.8 and that of the leached portion was 83.2. A 60.0 percent solids slurry of this clay had a Brookfield viscosity of 1.460 c.p.s. and a Hercules viscosity of 5.4 dynes.

EXAMPLE 29

A 19 percent solids slurry of the clay of example 28 was hydrothermally treated for 8 minutes at 385° C. The unleached brightness of the treated clay was 77.5 and the brightness of the leached clay was 83.6 A 60 percent solids slurry of the treated clay produced a 140 c.p.s. Brookfield minimum viscosity and a 3.5 Hercules minimum viscosity. A 70 percent solids slurry of the treated clay produced a Brookfield reading of 2,020 c.p.s. and a Hercules reading of 18 dynes/450 r.p.m. The Brookfield viscosity was thus reduced 90 percent. The brightness of the feed clay was slightly degraded by hydrothermal treatment, but after leaching, the hydrothermally treated clay was slightly brighter than the leached control. The browning effect of the hydrothermal treatment of this sample was neutralized by leaching, so that the hydrothermal treatment produced no residual discoloration.

EXAMPLE 30 (Control)

A nonoxidized gray clay, fine fraction, 91.8 percent less than 2 micron particles, was dispersed with "Calgon," filtered and dried to serve as a control for the next example. The unleached brightness of this clay was 74.8 and the leached brightness was 75.1. A 67.0 percent solids slurry had a minimum viscosity of 1.120 c.p.s. on the Brookfield meter and a viscosity of 18 dynes/500 r.p.m. on the Hercules meter.

EXAMPLE 31

A 25 percent solids slurry of the clay of example 30 was hydrothermally treated for 8 minutes at 385° C. The unleached brightness of this clay after treatment was 67.2 and the leached brightness was 67.7. A 67.0 percent solids slurry of the treated clay had a Brookfield viscosity of 700 c.p.s. and a Hercules viscosity of 18 dynes at 815 r.p.m. A 70 percent solids slurry of the treated clay had a Brookfield viscosity of 2,000 c.p.s. and a Hercules viscosity of 18 dynes at 200 r.p.m. While the brightness of the hydrothermally treated clay was degraded slightly the Brookfield viscosity was reduced 37 percent.

EXAMPLE 32 (Control)

A Central Georgia kaolin clay was untreated other than for centrifuging, decenting and drying prior to testing so as to serve as a control for the next example. The unleached brightness of this clay was 79.3 and its leached brightness was 85.5. The clays Hercules viscosity was 6.2 and its Brookfield viscosity was 92.

EXAMPLE 33

A 30 percent solids slurry of the clay of example 32 was hydrothermally treated for 30 minutes at 300° C. Following the hydrothermal treatment and prior to testing the slurry was centrifuged, decanted and dried. The unleached brightness of the treated clay was 79.6 and its leached brightness was 85.1. The Hercules viscosity of the treated clay was 7.9 and the Brookfield viscosity was improved 11 percent to 82 c.p.s.

EXAMPLE 34 (Control)

A Central Georgia clay was untreated as a control, but was filtered, washed and dried prior to testing. The unleached clay had a brightness of 79.3 and the leached clay had a brightness of 85.5. The clays Hercules viscosity was 6.4 and its Brookfield viscosity was 96.

EXAMPLE 35

A 30 percent solids slurry of the clay of example 34 was hydrothermally treated for 30 minutes at 300° C. The clay was then filtered, washed and dried. The unleached brightness of the treated clay was 79.2 and the leached brightness was 85.0. The Brookfield viscosity of the treated clay was reduced to 95 and the Hercules viscosity of the treated clay was 6.3.

EXAMPLE 36

A 30 percent solids slurry of the high viscosity crude of example 1 was hydrothermally treated for 8 minutes at 350° C. The resulting 70 Brookfield viscosity was 376 c.p.s. and the Hercules viscosity was 18 dynes at 745 r.p.m. for a 57 percent reduction in Brookfield viscosity.

EXAMPLE 37

A 30 percent solids slurry of the high viscosity crude of example 1 was hydrothermally treated for 45 minutes at 350° C. The resulting 70 percent viscosity was 207 c.p.s. and the Hercules viscosity was 18 dynes at 845 r.p.m. for a 77 percent reduction in Brookfield viscosity.

EXAMPLE 38

A 30 percent solids slurry of the clay of example 1 was treated with 0.4 percent NaOH and hydrothermally treated at 4.800 p.s.i. for 14 minutes at 350° C. The 70 percent viscosity figures after treatment were Brookfield 770 c.p.s. and Hercules 18 dynes at 765 r.p.m. for a 12 percent change in Brookfield viscosity.

EXAMPLE 39

A 25 percent solids slurry of the clay of example 1 was hydrothermally treated for 14 minutes at 415° C. The 70 percent Brookfield viscosity was 418 and the Hercules 70 percent viscosity was 18 dynes at 850 r.p.m. for a 52 percent reduction in Brookfield viscosity.

EXAMPLE 40

A 30 percent solids slurry of fine fraction primary kaolin clay, which prior to treatment had a 66 percent Brookfield viscosity of 380 c.p.s. with no flow at 67 percent, had a 304 c.p.s. Brookfield viscosity at 67 percent following a hydrothermal treatment at 385° C. for 30 minutes.

All of the above examples were run on the continuous hydrothermal treatment apparatus described above, but similar results have been obtained on different continuous hydrothermal apparatus and by means of batch processes.

The principle substance of many of the above examples grouped by clays is summarized in table I below.

TABLE I

| Example | Hydrothermal conditions | | | Minimum viscosity | | | Brookfield, percent reduction |
|---|---|---|---|---|---|---|---|
| | Time (min.) | Temp. (° C.) | Percent solids | Brookfield (cps.) | Percent solids | Hercules (dyne/r.p.m.) | |
| 1 | Control | | | 870 | 70 | 18/665 | |
| 2 | 4 | 350 | 15 | 710 | 70 | 18/690 | 18 |
| 3 | 4 | 350 | 30 | 580 | 70 | 18/700 | 34 |
| 4 | 8 | 350 | 15 | 530 | 70 | 18/755 | 39 |
| 5 | 14 | 250 | 15 | 740 | 70 | 18/775 | 15 |
| 6 | 14 | 250 | 25 | 610 | 70 | 18/880 | 30 |
| 7 | 14 | 300 | 15 | 630 | 70 | 18/780 | 28 |
| 8 | 14 | 300 | 25 | 262 | 70 | 18/955 | 70 |
| 9 | 14 | 300 | 30 | 336 | 70 | 18/910 | 61 |
| 10 | 14 | 350 | 15 | 412 | 70 | 18/840 | 53 |
| 11 | 14 | 350 | 25 | 217 | 70 | 18/1,090 | 75 |
| 12 | 14 | 350 | 30 | 258 | 70 | 18/1,085 | 71 |
| 13 | 14 | 385 | 25 | 236 | 70 | 18/1,075 | 73 |
| 14 | 14 | 385 | 30 | 236 | 70 | 17.0 | 73 |
| 15 | 20 | 300 | 25 | 290 | 70 | 18/895 | 67 |
| 16 | 30 | 300 | 30 | 296 | 70 | 18/1,085 | 66 |
| 17 | 30 | 350 | 30 | 190 | 70 | 18/1,040 | 79 |
| 18 | 14 | 430 | 15 | 500 | 70 | 18/530 | 43 |
| 19 | Control | | | 945 | 70 | 18/575 | |
| 20 | 8 | 300 | 25 | 720 | 70 | 18/510 | 24 |
| 21 | 8 | 300 | 35 | 612 | 70 | 18/555 | 35 |
| 22 | 8 | 385 | 12 | 442 | 70 | 18/625 | 53 |
| 23 | 8 | 385 | 23 | 441 | 70 | 18/650 | 53 |
| 24 | 8 | 385 | 35 | 590 | 70 | 18/535 | 38 |
| 25 | 20 | 200 | 25 | 740 | 70 | 18/585 | 22 |
| 26 | Control | | | 714 | 70 | | |
| 27 | 8 | 385 | 15 | 407 | 70 | | 43 |
| 28 | Control | | | 1,460 | 60 | 5.4 | |
| 29 | 8 | 385 | 19 | 140 | 60 | 3.5 | 90 |
| 30 | Control | | | 1,120 | 67 | 18/500 | |
| 31 | 8 | 385 | 25 | 700 | 67 | 18/815 | 37 |
| 32 | Control | | | 92 | 70 | 6.2 | |
| 33 | 30 | 300 | 30 | 82 | 70 | 7.9 | 11 |
| 34 | Control | | | 96 | 70 | 6.4 | |
| 35 | 30 | 300 | 30 | 95 | 70 | 6.3 | 1 |

The variations in the results of hydrothermal treatment based upon different clay samples are shown below in table II.

TABLE II

| Example | Clay | Conditions | Brookfield (cps.) | Percent reduction |
|---|---|---|---|---|
| 16 | Georgia kaolin | 30 min./300° C./30% | 296 | 66 |
| 33 | Central Georgia kaolin | 30 min./300° C./30% | 82 | 11 |
| 35 | do | 30 min./300° C./30% | 95 | 1 |

The variations in results of hydrothermal treatment based upon different retention times are shown below in table III.

TABLE III

| Example | Time | Temp. | Percent solids | Brookfield | Percent reduction |
|---|---|---|---|---|---|
| 8 | 14 | 300 | 25 | 262 | 70 |
| 15 | 20 | 300 | 25 | 290 | 67 |
| 9 | 14 | 300 | 30 | 336 | 61 |
| 16 | 30 | 300 | 30 | 296 | 66 |
| 2 | 4 | 350 | 15 | 710 | 18 |
| 4 | 8 | 350 | 15 | 530 | 39 |
| 10 | 14 | 350 | 15 | 412 | 53 |
| 3 | 4 | 350 | 30 | 580 | 34 |
| 36 | 8 | 350 | 30 | 376 | 51 |
| 12 | 14 | 350 | 30 | 258 | 70 |
| 17 | 30 | 350 | 30 | 190 | 78 |
| 37 | 45 | 350 | 30 | 207 | 77 |

The variation in results of hydrothermal treatment based upon different temperatures is shown in table IV.

TABLE IV

| Example | Temp. | Time | Percent solids | Brookfield | Percent reduction |
|---|---|---|---|---|---|
| 6 | 250 | 14 | 25 | 610 | 30 |
| 8 | 300 | 14 | 25 | 262 | 70 |
| 11 | 350 | 14 | 25 | 217 | 75 |
| 13 | 385 | 14 | 25 | 236 | 73 |
| 39 | 415 | 14 | 25 | 418 | 52 |
| 5 | 250 | 14 | 15 | 740 | 15 |
| 7 | 300 | 14 | 15 | 630 | 28 |
| 10 | 350 | 14 | 15 | 412 | 53 |
| 9 | 300 | 14 | 30 | 336 | 61 |
| 12 | 350 | 14 | 30 | 258 | 70 |
| 14 | 385 | 14 | 30 | 236 | 73 |
| 21 | 300 | 8 | 35 | 612 | 35 |
| 24 | 385 | 8 | 35 | 590 | 38 |
| 16 | 300 | 30 | 30 | 296 | 66 |
| 17 | 350 | 30 | 30 | 190 | 78 |

The variation in results of hydrothermal treatment based upon different percent solids is shown below in table V.

TABLE V

| Example | Percent solids | Time | Temp. | Brookfield | Percent reduction |
|---|---|---|---|---|---|
| 7 | 15 | 14 | 300 | 630 | 28 |
| 8 | 25 | 14 | 300 | 262 | 70 |
| 9 | 30 | 14 | 300 | 336 | 61 |
| 10 | 15 | 14 | 350 | 412 | 53 |
| 11 | 25 | 14 | 350 | 217 | 75 |
| 12 | 30 | 14 | 350 | 258 | 70 |
| 22 | 12 | 8 | 385 | 442 | 53 |
| 23 | 23 | 8 | 385 | 441 | 53 |
| 24 | 35 | 8 | 385 | 590 | 38 |
| 2 | 15 | 4 | 350 | 710 | 18 |
| 3 | 30 | 4 | 350 | 580 | 34 |
| 20 | 25 | 8 | 300 | 720 | 24 |
| 21 | 35 | 8 | 300 | 612 | 35 |
| 5 | 15 | 14 | 250 | 740 | 15 |
| 6 | 25 | 14 | 250 | 610 | 30 |
| 13 | 25 | 14 | 385 | 236 | 73 |
| 14 | 30 | 14 | 385 | 236 | 73 |

A small amount of deflocculant added to the slurry under hydrothermal treatment may be helpful under certain circumstances.

It has also been noted that the addition of sodium hydroxide to the slurry, on the order of one percent or less may be helpful in improving the brightness of the clay, both before and after leaching. Thus it may be seen that this method involves treating kaolin clay slurries to temperatures in the range of 200° C. to 460° C., under pressures up to 10,000 pounds per square inch for a period of time ranging from 1 to 60 minutes. The method results in a koalin clay exhibiting greatly reduced viscosity when mixed in a slurry containing 5 to 60 percent kaolin. It can be utilized in a batch process or it can be a continuously flowing process if two or more pressurized condensing chambers are used in conjunction with the reaction chamber. The restraining or backup pressure in the condensing chambers is maintained slightly less than that in the reaction chamber thus allowing the slurry to flow continuously through the reaction chambers into the condensing chambers. This pressure differential can be varied in order to vary the retention time of the slurry in the reaction chamber. The pressure differential can be varied by changing the pump backup pressure to the condenser chambers or by changing the temperature of the reaction chamber, since the vapor pressure therein is dependent upon the temperature of the slurry.

While the invention has been described with references to its preferred embodiments, it will be understood by those skilled in the art that various changes may be made equivalents may be substituted for elements thereof without departing from the true spirit and scope of the invention. In addition many modifications may be made to adapt a particular situation or material to the teachings of the invention without departing from the scope of its essential teachings.

What is claimed is:

1. The method of reducing the viscosity of a naturally occurring kaolin clay having a solids content between 5 and 60 percent by a hydrothermal treatment comprising:
   a. heating said slurry in a reaction zone,
   b. retaining said slurry in said reaction zone for a predetermined retention time of approximately 1 to 60 minutes,
   c. maintaining a temperature greater than 200° C. but less than 460° C. in said reaction zone, and
   d. simultaneously applying a restraining pressure less than 10,000 pounds per square inch sufficient to provide said predetermined retention time for said slurry in said reaction zone.

2. The method of claim 1 in which said slurry is provided continuous access to and from the reaction zone.

3. The method of claim 2 further including heating said slurry as it flows continuously through said reaction zone with a retention time in said reaction zone of from approximately 1 minute to 60 minutes.

4. The method of claim 3 in which the temperature of said reaction zone is maintained at a temperature of less than 430° C.

5. The method of claim 4 further including flowing said slurry through said reaction zone and into a condensing zone against said restraining pressure.

6. The method of claim 5 further including cooling said slurry in said condensing zone while controllably decreasing the pressure in said condensing zone.

7. The method of claim 6 further including removing said slurry from said condensing zone to atmospheric pressures while continuing to flow said slurry through said reaction zone under the simultaneously applied conditions of heat and pressure defined above.